C. A. SMITH.
TIRE PROTECTOR.
APPLICATION FILED JAN. 15, 1912.
1,064,100.
Patented June 10, 1913.
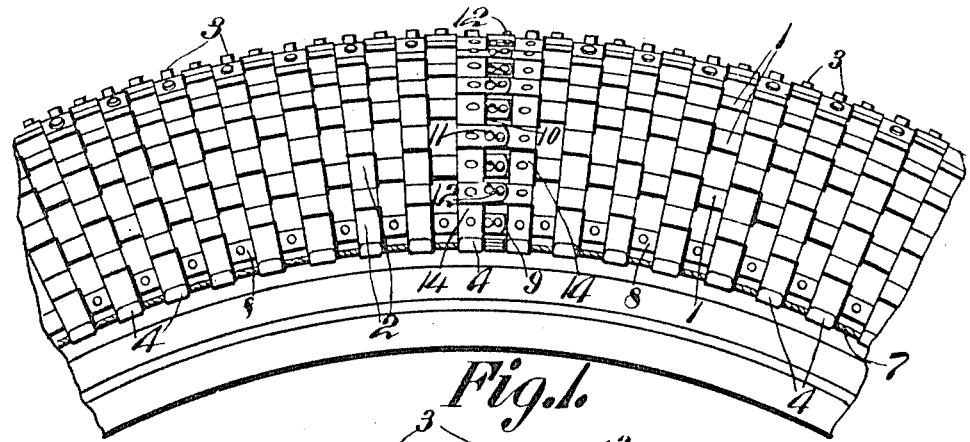
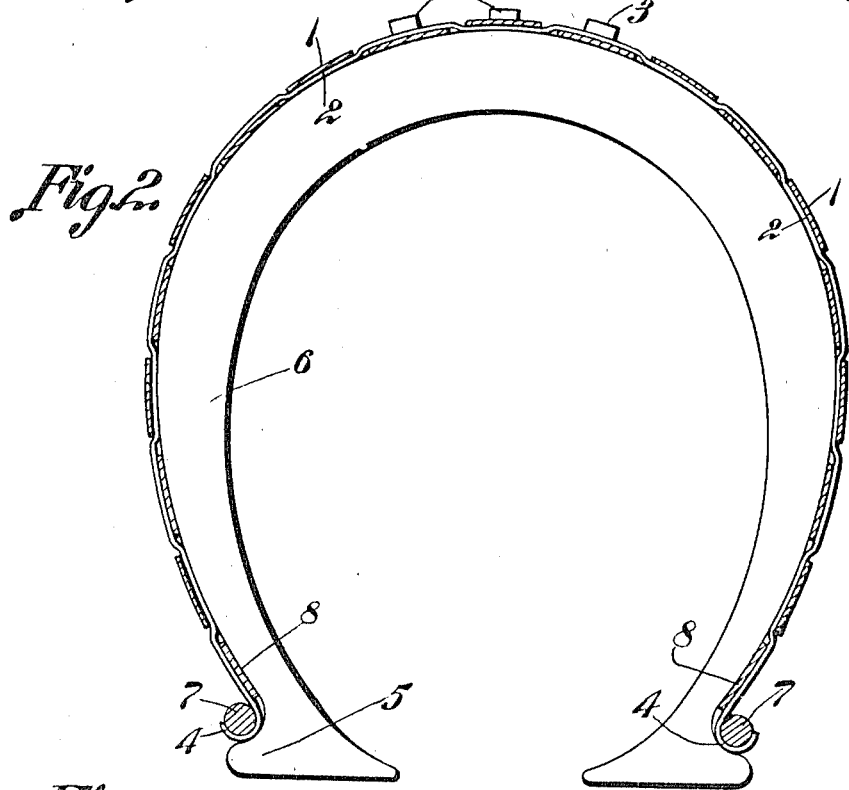
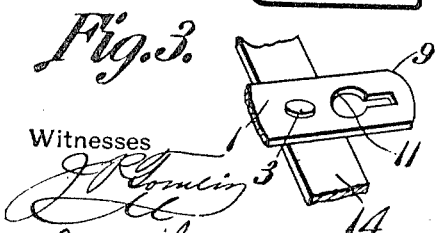
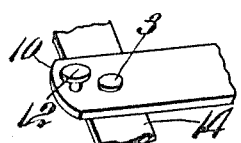
C. A. Smith.
Inventor
Witnesses
by
Attorneys

UNITED STATES PATENT OFFICE.

CLIFTON A. SMITH, OF NEW ORLEANS, LOUISIANA.

TIRE-PROTECTOR.

1,064,100. Specification of Letters Patent. Patented June 10, 1913.

Application filed January 15, 1912. Serial No. 671,184.

*To all whom it may concern:*

Be it known that I, CLIFTON A. SMITH, a citizen of the United States, residing at New Orleans, in the parish of Orleans and State of Louisiana, have invented a new and useful Tire-Protector, of which the following is a specification.

The object of the present invention is to provide a tire protector, adapted to resist puncture of the tire, and so constructed that, when the tire is inflated, the protector will automatically grip the tire.

A further object of the invention is to provide a tire protector, consisting of interwoven strips means being provided for holding the strips together, and means being provided for holding the ends of the protector together.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in side elevation, a portion of a tire equipped with the protector constructed in accordance with the present invention, parts of the protector being broken away; Fig. 2 is a transverse section; and Fig. 3 is a fragmental perspective showing the means whereby the adjacent, meeting ends of the protector are held together.

In carrying out the invention, a series of longitudinal strips 1 and 8 are provided, these strips being of sufficient length to extend entirely around the wheel, circumferentially of the same. Disposed approximately at right angles to the longitudinal strips 1 and 8, are transverse strips 2, interwoven with the strips 1 and 8. The transverse strips 2, as best shown in Fig. 1, taper, toward their ends, so that the protector will assume a trough-like form. The strips 1 and 2 are preferably fashioned from resilient metal. At their points of crossing, the strips 1 and 2 are united by securing elements 3, which may be rivets. The number of rivets may be increased or decreased, from the showing of the drawings, as the exigencies of the case may dictate. The extremities of the rivets 3 outstand beyond the tread surface of the protector, so as to form an effective anti-slipping means.

The ends of alternate transverse strips 2 only terminate in binder-receiving elements, preferably taking the form of hooks 4 which hooks 4 fit into the bead 5 of the tire 6, the hooks receiving the securing rings 7, whereby the protector is held upon the tire. Those longitudinal strips 8 which lie at the extreme lateral edges of the protector, are disposed beneath the ends of said alternate transverse strips 2, so as to receive the inward thrust of the ends of the said transverse strips 2, thereby to protect the tire 6 against injury from the hooked, free ends of the transverse strips.

One end 9 of each longitudinal strip 1 terminates in a key-hole slot 11 and the other end 10 of each longitudinal strip is provided with a headed stud 12. The head of the stud 12 will pass freely through the larger portion of the key-hole slot 11, and the neck of the stud 12 will register in the contracted portion of the slot 11. The ends 9 and 10 of the longitudinal strips 1 preferably protrude beyond those transverse strips 14 which are adjacent the ends of the protector.

In practical operation, when the tire 6 is inflated, the hooks 4 will be made to engage with the rings 6, and at the same time, the protector will be expanded longitudinally, causing the studs 12 to fit closely, and against accidental displacement, in the key-hole slots 11, it being obvious that when the tire 6 is inflated, the protector will be completely and closely filled by the tire.

Having thus described the invention, what is claimed is:—

A tire protector consisting of longitudinal and transverse strips closely interwoven, the transverse strips tapering toward their free ends and alternate ones only of the transverse strips terminating in outstanding, binder-receiving elements, the longitudinal strips which lie at the extreme lateral edges of the protector being disposed beneath the ends of the said alternate transverse strips to receive the thrust of the binder.

In testimony that I claim the foregoing as my own, I have hereto affixed my signature in the presence of two witnesses.

CLIFTON A. SMITH.

Witnesses:
A. M. BUCHMANN,
W. M. LAWTON.